US009206055B2

(12) United States Patent
Sha et al.

(10) Patent No.: US 9,206,055 B2
(45) Date of Patent: Dec. 8, 2015

(54) TITANIUMRICH HYDROCHLORIC ACID LEACHING RESIDUE, USE THEREOF AND PREPARATION METHOD OF TITANIUM DIOXIDE

(76) Inventors: Lilin Sha, Panzhihua (CN); Shuzhong Chen, Reno, NV (US)

( * ) Notice: Subject to any disclaimer, the term of this patent is extended or adjusted under 35 U.S.C. 154(b) by 918 days.

(21) Appl. No.: 13/393,805

(22) PCT Filed: Sep. 2, 2010

(86) PCT No.: PCT/CN2010/076579
§ 371 (c)(1),
(2), (4) Date: May 4, 2012

(87) PCT Pub. No.: WO2011/026434
PCT Pub. Date: Mar. 10, 2011

(65) Prior Publication Data
US 2012/0227628 A1   Sep. 13, 2012

(30) Foreign Application Priority Data

Sep. 2, 2009   (CN) .......................... 2009 1 0306494

(51) Int. Cl.
| | |
|---|---|
| C01G 23/047 | (2006.01) |
| C01G 23/053 | (2006.01) |
| C09C 1/36 | (2006.01) |
| C22B 3/10 | (2006.01) |
| C22B 7/00 | (2006.01) |
| C22B 34/12 | (2006.01) |

(52) U.S. Cl.
CPC ............ *C01G 23/047* (2013.01); *C01G 23/053* (2013.01); *C01G 23/0536* (2013.01); *C09C 1/3607* (2013.01); *C22B 3/10* (2013.01); *C22B 7/007* (2013.01); *C22B 34/1213* (2013.01); *C22B 34/1245* (2013.01); *C22B 34/1259* (2013.01); *C01P 2006/10* (2013.01); *C01P 2006/80* (2013.01); *Y02W 30/54* (2015.05)

(58) Field of Classification Search
None
See application file for complete search history.

(56) References Cited

U.S. PATENT DOCUMENTS

| | | | | |
|---|---|---|---|---|
| 3,597,189 A | * | 8/1971 | Sinha et al. | ...................... 423/53 |
| 3,825,419 A | * | 7/1974 | Chen | ................................ 423/86 |
| 3,929,963 A | * | 12/1975 | Kurata et al. | ................... 423/86 |

FOREIGN PATENT DOCUMENTS

| | | | |
|---|---|---|---|
| CN | 1114364 | A | 1/1996 |
| CN | 101177297 | A | 5/2008 |
| GB | 1316195 | * | 5/1973 |
| GB | 1507240 | * | 4/1978 |
| ZA | 200002644 | A | 11/2000 |

OTHER PUBLICATIONS

Dong et al., Translation of the study of process mineralogy and mineral purification for synthetic rutile, Chinese J. of Rare Metals, No. 4, pp. 16-23, 1984.*
Zhou et al., Translation of "The study of producing acid dissoluble rich ilmenite concentrate by microwave irradiation hydrochloric acid immersion" J. of Kunming Technical College of Metallurgey, vol. 10, No. 2, pp. 102-10, 1994.*
Dong et al, The study of process mineralogy and mineral purification for synthetic rutile, Chinese Journal of Rare Metals, No. 4, pp. 16-23 (1984).
Liu et al., The Kinetics of the fluidized bed leaching of Pan Zhu Hua ilmenite, Mining and Metallurgical Engineering, 11(2):48-52 (1991).
Manufacturing and Application Techniques of Titanium Dioxide compiled by Chen C. and Liu C., Chemical Industry Press, p. 211 (2006) (English translation thereof is enclosed herein).
Fu et al., Research on preparing technology of synthetic rutile by hydrochloric acid leaching, Iron Steel Vanadium Titanium, 27(2):1-6 (2006).
Wang et al., Ilmenite Hydrochloric Acid Leaching for Synthetic Rutile Preparation, Nonferrous Metals, 59(4), pp. 108-111 (2007).
Zhou et al., The study of producing acid dissoluble rich ilmenite concentrate by "microwave Irradiation-hydrochloric acid immerse", Journal of Kunming Technical College of Metallurgy, vol. 10, No. 2, pp. 102-110 (1994).
International Search Report (and English translation thereof) dated Dec. 9, 2010 for International patent application PCT/CN2010/076579, filed Sep. 2, 2010.
Written Opinion (and English translation thereof) dated Dec. 9, 2010 for International patent application PCT/CN2010/076579, filed Sep. 2, 2010.

* cited by examiner

*Primary Examiner* — Steven Bos
(74) *Attorney, Agent, or Firm* — Knobbe Martens Olson & Bear LLP

(57) ABSTRACT

Enriched titanium hydrochloric acid extract residue is provided, for use as the feed stock in the preparation of titanium pigment by sulfuric acid process. The present invention belongs to the field of the preparation of titanium pigment and particularly, relates to the enriched titanium hydrochloric acid extract residue prepared from ilmenite by hydrochloric acid leaching, its use and the method of preparing titanium pigment. The method for preparing titanium pigment using the enriched titanium hydrochloric acid extract residue can effectively utilize the fine ilmenite in Panxi area (the utilization rate is almost 100%), obtain the titanium sulfate solution with an ultralow ratio of iron to titanium dioxide (Fe/TiO2) and double the throughput of digesting equipment. Said method can simultaneously spare two steps of iron removal by freezing and titanium sulfate solution concentration with much energy consumption, reduce the times of washing with metatitanic acid, thereby, both of the discharge of acid waste water and the production of FeSO4 are reduced. Said method provides a feed stock selection for preparing titanium pigment by sulfuric acid process.

8 Claims, 1 Drawing Sheet

TITANIUMRICH HYDROCHLORIC ACID LEACHING RESIDUE, USE THEREOF AND PREPARATION METHOD OF TITANIUM DIOXIDE

RELATED APPLICATIONS

The instant application is the U.S. National Phase under 35 U.S.C. §371 of International Application No. PCT/CN2010/076579 entitled TITANIUMRICH HYDROCHLORIC ACID LEACHING RESIDUE, USE THEREOF AND PREPARATION METHOD OF TITANIUM DIOXIDE, filed Sep. 2, 2010, designating the U.S. and published in Chinese on Mar. 10, 2011 as WO2011/026434, which claims priority to Chinese Application No. 200910306494.5, filed Sep. 2, 2009. The content of these applications are herein incorporated by reference in their entireties.

TECHNICAL FIELD

The present invention belongs to the field of the preparation of titanium pigment and in particular, relates to enriched titanium hydrochloric acid extract residue prepared by hydrochloric acid leaching ilmenite, its new usage and the method to prepare titanium pigment.

BACKGROUND TECHNOLOGIES

Titanium is a kind of very important strategic material and plays a vital role in global economy. China is one of few countries rich in titanium reserves and the Panxi area holds more than 90% of the national reserves. However, ilmenite in this region is mainly intergrowth ore. Its titanium dioxide grade is low, normally around 46-47 wt %. Secondly, ilmenite (also called ilmenite concentrate) in this region has high calcium and magnesium impurity contents and normally the calcium oxide and magnesium oxide content is approximately 5-7% in total. In addition, fine granularity is another dominant characteristic of the ilmenite, about 50% of which is less than 200 mesh. Furthermore, the ilmenite ores get finer as mining more deeply.

Nowadays, the two main processes worldwide of preparing titanium pigment are chloride process and sulfuric acid process.

The sulfuric acid process utilizes primary ilmenite or titanium slag to prepare titanium pigment by digesting, leaching, (concentrated crystallization), hydrolysis, water-wash, bleaching, calcination with crystal seed added and other technics. The titanium slag used wherein is obtained by pyrometallurgical smelting: ilmenite together with reducing agent is heated in electric furnace at 1600-1800° C., the ferriferous oxide in ilmenite is reduced into metallic iron by reducing agent at high-temperature smelting, and then the molten iron is separated from slag and get the product of pig iron, which enables most of iron ingredient removed from the ilmenite while titanium and other impurities remain in the smelting slag to form titanium slag. Although it results in heavy pollution, the sulfuric acid process is predominantly used in preparing titanium pigment in Panxi area and even in China due to mature techniques, low requirements of feed stock and low cost.

The chloride process causes much less pollution than the sulfuric acid process but it needs higher-quality feed stock, which usually require higher titanium dioxide content than 90%, bigger granularity than 200 mesh, and low impurity content. Thus, the chloride process mainly utilizes rutile as feed stock, especially synthetic rutile, since the reserves of natural rutile are extremely low, only 0.3-1% of the total reserves of titanium. There are difficulties in preparing synthetic rutile using Panxi ilmenite due to its low ore grade, high impurity and fine granularity. It was indicated in the article entitled "Ilmenite Hydrochloric Acid Leaching for Synthetic Rutile Preparation" (*Nonferrous Metals*, 59 (4), November 2007, pp. 108-111) that hydrochloric acid leaching is the preferred method to prepare synthetic rutile, after comparing the advantages and disadvantages of different techniques and considering the features of Panxi ilmenite. Currently, two major technical processes of hydrochloric acid leaching are Preoxidation-Liquefaction Leaching and united technologies of beneficiation and metallurgy Pressure Leaching. Preoxidation-Liquefaction Leaching resolved the particle size change problems during the raw ore leaching process through preoxidation. However, the fining rate of this process is still 15% approximately ("Research on Preparing Technology of Synthetic Rutile by Hydrochloric Acid Leaching", *IRON STEEL VANADIUM TITANIUM*, 27 (2), June 2006, pp. 1-6). Given the fact that more than 50% of ilmenite concentrate is less than 200 mesh, at least about 60% of the synthetic rutile is less than 200 mesh. Thus, it is of little economical benefits to prepare titanium pigment by utilizing synthetic rutile obtained from Panxi ilmenite following the state-of-the-arts.

The chloride process requires the feed stock containing more than 90% of titanium dioxide, which usually is the synthetic rutile prepared by hydrochloric acid leaching. In the past years, technicians in the production and research field of titanium pigment have been dedicated to solve the problems of granularity and leaching behavior during the hydrochloric acid leaching process for Panxi ilmenite, so as to upgrade the quality of synthetic rutile which is then utilized to prepare titanium pigment by chloride process. But none have ever utilized the intermediate product, that is the titanium residue obtained by the process of "acid leaching—filteration—washing" (described as enriched titanium hydrochloric acid extract residue in the present invention), in the production of titanium pigment, not to mention that anyone has utilized the enriched titanium hydrochloric acid extract residue to prepare titanium pigment by sulfuric acid process.

DESCRIPTION OF THE INVENTION

The first technical problem resolved in the present invention is to provide enriched titanium hydrochloric acid extract residue which can be applied to prepare titanium pigment by sulfuric acid process. The extract residue herein consists of the loose and porous residue and metatitanic acid aggregates which are obtained after removing iron from crystal lattice of ilmenite ($FeTiO_3$) by hydrochloric acid leaching. The residue also contains small amounts of rutile and titanaugite and most of $TiO_2$ ingredient is amorphous. The residue herein is white, light yellow or light grey grain or powder, where the content of $TiO_2$ is 65-97% and the total iron content is no more than 8%. The residue herein was prepared by following the protocol below:

a. enriched titanium hydrochloric acid extant residue which is solid is prepared from ilmenite by hydrochloric acid leaching;
b. the solid prepared from step a is dried and to obtain high titanium hydrochloric acid extract residue;
characterized in that, the extract residue can be dissolved by sulfuric acid and the water content is no more than 20%.

The specific gravity of the enriched titanium hydrochloric acid extract residue of the present invention is 2.9-3.6.

The hydrochloric acid leaching process mentioned in step a for preparing enriched titanium hydrochloric acid extract residue can be direct hydrochloric acid leaching process, BCA hydrochloric acid leaching process, preoxidation-liquefaction leaching process or peroxidation-united technologies of beneficiation and metallurgy pressure leaching process.

The direct hydrochloric acid leaching process herein which can be applied to the present invention includes the following steps:

A. Ilmenite and hydrochloric acid were mixed together, where the ratio of mass of ilmenite to volume of hydrochloric acid was 1 g:2.5-5 ml and the concentration of hydrochloric acid was 18%-30%, and heated to 70-150° C. to carry out the leaching reaction for 1-8 hours;

B. The leaching slurry was filtered and the obtained solid was then dried. The dried solid was the enriched titanium hydrochloric acid extract residue.

According to the method of the present invention, the reaction liquid in step B was firstly cooled down to 80-90° C. and then filtered. The drying temperature was maintained lower than 350° C. and the drying time was 4-8 hours.

The second technical problem resolved in the present invention is to provide new usages of enriched titanium hydrochloric acid extract residue so as to improve the utilization of ilmenite.

The present invention provides the application of enriched titanium hydrochloric acid extract residue acting as feed stock in the sulfuric acid preparation of titanium pigment. In detail, the enriched titanium hydrochloric acid extract residue obtained from ilmenite by hydrochloric acid leaching is utilized as feed stock or one of feed stocks to prepare titanium pigment by the sulfuric acid process. During the preparation of titanium pigment by the sulfuric acid process, if a solid phase method is adopted as the digesting technique, the enriched titanium hydrochloric acid extract residue can be used together with ilmenite or titanium slags.

The third technical problem resolved in the present invention is to provide a new method to prepare titanium pigment using enriched titanium hydrochloric acid extract residue as feed stock, which offers a new option for preparation of titanium pigment by the sulfuric acid process. The method herein comprises the following steps:

a. enriched titanium hydrochloric acid extract residue was prepared from ilmenite by hydrochloric acid leaching and then dried till the water content was no higher than 20%;

b. the enriched titanium hydrochloric acid extract residue obtained from step a was utilized as feed stock or one of feed stocks to prepare titanium pigment by sulfuric acid process.

The technological conditions of the hydrochloric acid leaching process mentioned in step a are the currently used conditions in preparing synthetic rutile and described in detail below, (1) direct hydrochloric acid leaching process is adopted, which means that ilmenite is leached by hydrochloric acid directly, and the solid obtained after filtration and washing is the enriched titanium hydrochloric acid extract residue; or (2) BCA hydrochloric acid leaching process is adopted, which means that ilmenite together with 3-6% reducing agents (coal, petroleum coke) is added to rotary kiln continuously where $Fe^{3+}$ in the ores is reduced to $Fe^{2+}$ at about 870° C., the leaching process is then carried out in 18-20% of hydrochloric acid at 130-143° C. for 4 hours, and the solid finally obtained, after leaching and filtration, is the enriched titanium hydrochloric acid extract residue; or (3) preoxidation-liquefaction leaching process is adopted, which means that ilmenite is preoxidized, sieved, and leached by hydrochloric acid and the solid obtained is the enriched titanium hydrochloric acid extract residue (see techniques in Dynamics Research on Liquefaction Hydrochloric Acid Leaching of Panzhihua Ilmenite, Liu Z., Huang Z., Wang K., *Mining and Metallurgical Engineering*, 11(2), 1991, pp. 48-52); or (4) preoxidation-united technologies of beneficiation and metallurgy pressure leaching process is adopted, which means that preoxidation and magnetic separation followed by hydrochloric acid leaching is carried out on ilmenite and the solid finally obtained is the enriched titanium hydrochloric acid extract residue (see techniques in Research on Preparing Technology of Synthetic Rutile by Hydrochloric Acid Leaching, *IRON STEEL VANADIUM TITANIUM*, Fu Z., Huang B., Wang X., 27 (6), June 2006, pp. 1-6).

Among the four above-mentioned methods to process ilmenite, the most convenient one is the direct hydrochloric acid leaching process since the acid-leached ilmenite can be directly applied to the preparation of titanium pigment by following the prior art of sulfuric acid process, without the problems of fining and low ore grade during acid leaching.

The granularity of Panxi ilmenite is relatively small and partially become fine after acid leaching Although the fining rate can be controlled less than 15% using preoxidation-liquefaction leaching process, about 60% of the synthesized rutile's size is still less than 200 mesh. Meanwhile, given the fact that the synthetic rutile possesses excellent chemical stability thus cannot be digested by sulfuric acid, the synthetic rutile cannot be applied to prepare titanium pigment by sulfuric acid either. Therefore, the synthetic rutile most of which is less than 200 mesh can be utilized as feed stock in the preparation of titanium pigment neither by chloride process nor by sulfuric acid process, which causes at least 50% of ilmenite may be wasted.

The method to prepare titanium pigment by sulfuric acid process using the enriched titanium hydrochloric acid extract residue utilizes the fine Panxi ilmenite effectively (the utilization ratio is almost 100%); reduces the consumption of sulfuric acid by about 50% in the preparation of titanium pigment by sulfuric acid process so as to double the throughput of digesting equipment; spares the two energy-consuming steps of iron removal by freezing as well as concentration of titanium sulfate solution. The titanium sulfate solution prepared from the enriched titanium hydrochloric acid extract residue by digesting contains very little ferrous and ferric iron, which decreases the washing times for metatitanic acid sharply so as to reduce the discharge of acid wastewater and also eliminates or reduces the generation of ferrous sulfate. Hardly ferrous sulfate is produced if the enriched titanium hydrochloric acid extract residue by itself is utilized as feed stock. If it is mixed with other feed stocks such as ilmenite, the utilization of enriched titanium hydrochloric acid extract residue will also reduce the production of ferrous sulfate dramatically. Thus, the present invention provides a new and better option of feed stock for the preparation of titanium pigment by sulfuric acid process.

Sample 1 and 2 mainly contain the loose and porous residue obtained by leaching iron from crystal lattice of ilmenite ($FeTiO_3$), while Sample 3 is mainly composed of metatitanic acid aggregates.

Figure 1:
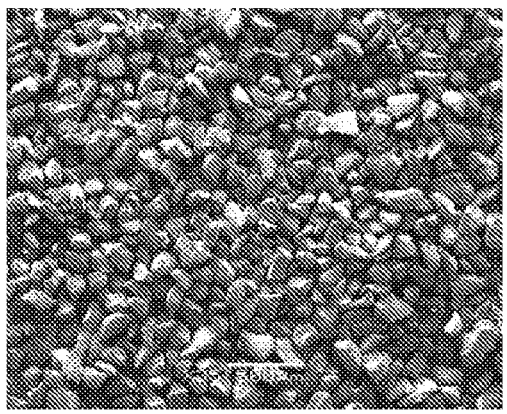
FIG. 1 and FIG. 2 are images of Scanning Electron Microscope at different resolutions for enriched titanium hydrochloric acid extract residue Sample 1 of the present invention.
Figure 2:
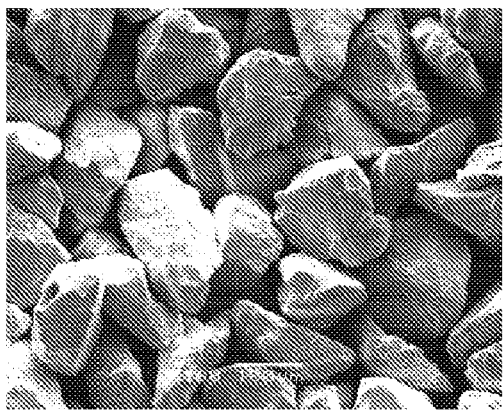
Figure 3:
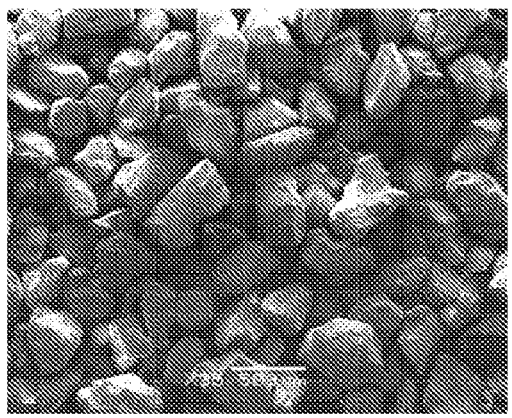
FIG. 3 and FIG. 4 are images of Scanning Electron Microscope at different resolutions for enriched titanium hydrochloric acid extract residue Sample 2 of the present invention.
Figure 4:
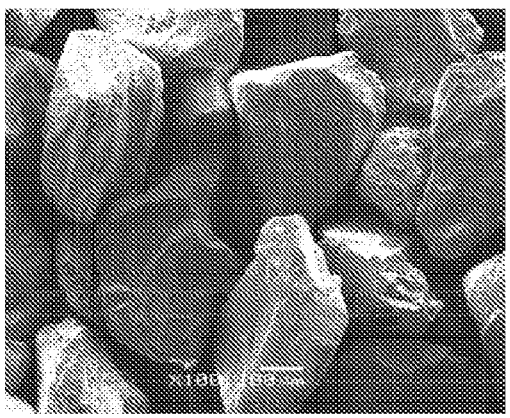
Figure 5:
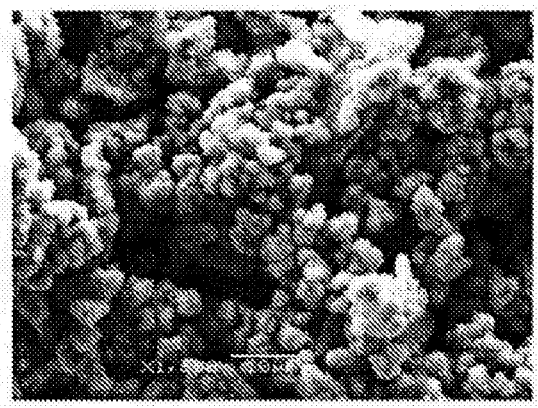
FIG. 5 and FIG. 6 are images of Scanning Electron Microscope at different resolutions for enriched titanium hydrochloric acid extract residue Sample 3 of the present invention.
Figure 6:
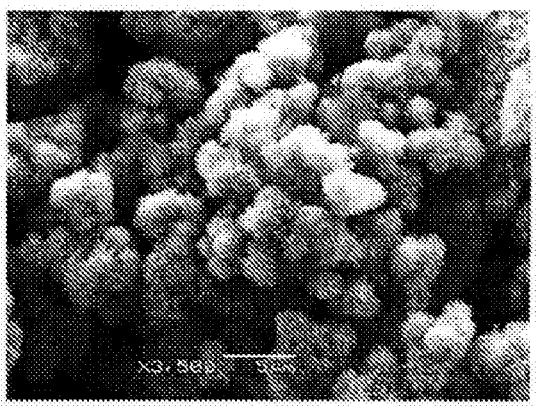

The magnification is 35× in FIG. 1, 100× in FIG. 2, 35× in FIG. 3, 100× in FIG. 4, 1000× in FIG. 5, and 3500× in FIG. 6.

PARTICULAR EMBODIMENTS

The Examples described below in the present invention should not limit the scope of the present invention.

In the prior art of preparing titanium pigment by sulfuric acid process, the feed stock is ilmenite concentrate or titanium slag obtained by pyrometallurgy and the $TiO_2$ content of the product is 75-80% approximately. None or very little impurities other than iron can be removed by pyrometallurgy during the titanium slag production from the ilmenite. Some technical problems such as emissions of dust or noxious gases have to be solved during the preparation process. Furthermore, when the titanium slag obtained by pyrometallurgy is used to prepare titanium sulfate solution for the preparation by sulfuric acid process, the solution is reducible. But the currently available equipment is designed for the reactions in the oxidation environment, so the equipment, the procedures and etc. should be reformed or modified partially if titanium slag is utilized as feed stock in the sulfuric acid process.

The present invention provides a preparation method of titanium pigment, where the Panxi ilmenite concentrate is leached by hydrochloric acid to obtain enriched titanium hydrochloric acid extract residue containing more than 90% of $TiO_2$. Meanwhile, more than 90% of Ca, Mg, Fe and Mn impurities as well as more than 60% V and Al impurities can be removed during hydrochloric acid leaching. The energy consumed in the preparation of enriched titanium hydrochloric acid extract residue by hydrochloric acid leaching is much lower than in the preparation of acid-soluble titanium slag by pyrometallurgy. The preparation method of titanium pigment in the present invention can also be applied to the ilmenite ore that outside of the Panxi area. Ilmenite is a mineral composed of iron oxides and titanium oxides. Its chemical formula is $TiO_2 \cdot FeO$ or $FeTiO_3$ and the theoretical composition is 47.36% of FeO and 52.64% of $TiO_2$. The $Fe^{2+}$ wherein can be substituted by $Mg^{2+}$ and $Mn^{2+}$ isomorphously so as to form the series of $FeTiO_3$—$MgTiO_3$ or $FeTiO_3$—$MnTiO_3$. It is called ilmenite when FeO is dominant, called dauphinite when MgO is dominant, and called pyrophanite when MnO is dominant. The isomorphous substitutions of Nb, Ta and etc. are common as well. Dauphinite and pyrophanite can also act as feed stocks for the preparation method in the present invention. Additionally, the weathered or oxidized ilmenite, such as ilmenite from beach sands, can be utilized as feed stock too. The ilmenite from beach sands belongs to weathered and oxidized ilmenite, where ferrous iron is oxidized to ferric iron after weathered for years and the ferric iron is then leached by rain. So the content of $TiO_2$ in the ilmenite from beach sands is higher than 52.64% and reaches 75% sometimes.

The hydrochloric acid leaching process and the sulfuric acid process mentioned in the present invention can be the process(es) known in the prior art, for example, the hydrochloric acid leaching process can be direct hydrochloric acid leaching process, BCA hydrochloric acid leaching process, preoxidation-liquefaction leaching process, or preoxidation-united technologies of beneficiation and metallurgy leaching process. For example, the direct hydrochloric acid leaching is a simple technique to leach ilmenite. The leaching techniques are described in detail below:

1. Direct hydrochloric acid leaching process:
A. Ilmenite and hydrochloric acid is mixed together in the ratio of 1 g:2.5-5 ml, where the concentration of hydrochloric acid is 18-30%. The mixture is heated to 70-150° C. and then leached for 1-8 hours.

B. The reaction solution is filtered and the obtained solid is then dried. The dried solid is the acid-soluble enriched titanium hydrochloric acid extract residue.

Wherein in step A, hydrochloric acid is preheated to 70° C. before mixing in order to minimize the heating time. This step can be skipped if the heating rate is fast. But if the temperature is too high, gas of hydrochloric acid will be emitted, as a result.

When filtered in step B, the reaction slurry is firstly cooled down to 80-90° C. and then filtered by any means, such as vacuum filtration or pressure filtration.

During drying in step B, the drying temperature is maintained lower than 350° C. and the drying time is 4-8 hours. If the temperature is too high, synthetic rutile may be produced and it cannot be dissolved in sulfuric acid. The preferred temperature should be lower than 250° C.

Examples of processing ilmenite by direct hydrochloric acid leaching are described as follows:

Example 1

Preparation of Enriched Titanium Hydrochloric Acid Extract Residue from Ilmenite by Direct Hydrochloric Acid Leaching 1. 45 L of 20% hydrochloric acid was measured and poured into a 50 L enamel-lining vessel;
2. 15 kg of ilmenite concentrate was weighted and poured into the vessel. The vessel was sealed and the mixer was started.
3. The vessel was heated rapidly to around 140° C.;
4. The vessel was kept at 140° C. for 5 hours and the vessel was cooled down to 80° C. naturally;
5. 3 L of materials taken from the vessel was filtered rapidly. The filter was made by connecting Buchner flask to vacuum pump.
6. The filter cake was washed by 3 L of deionized water in three times then dried at 110° C. for 6 hours to obtain the enriched titanium hydrochloric acid extract residue. The water content of the produced extract residue was lower than 1%.

Chemical composition of the enriched titanium hydrochloric acid extract residue was analyzed and the results were showed in Table 1:

TABLE 1

Main chemical compositions of the ilmenite concentrate in Panzhihua area and the enriched titanium hydrochloric acid extract residue (wt. %)

| | $Al_2O_3$ | CaO | $Fe_2O_3$ | MgO | $SiO_2$ | $TiO_2$ | $V_2O_5$ |
|---|---|---|---|---|---|---|---|
| Feed (Ilmenite concentrate) | 0.9 | 1.1 | 44.0 | 4.0 | 3.0 | 46.1 | 0.1 |
| Enriched_titanium hydrochloric acid extract residue | 0.6 | 0.5 | 1.6 | 0.3 | 5.0 | 90.6 | 0.1 |

Example 2

Preparation of Enriched Titanium Hydrochloric Acid Extract Residue from Ilmenite Concentrate by Direct Hydrochloric Acid Leaching 1. 45 L of 20% hydrochloric acid was measured and poured into a 50 L enamel-lining vessel;
2. 15 kg of ilmenite concentrate was weighted and poured into the vessel. The vessel was sealed and the mixer was started.

3. The vessel was heated rapidly to around 120° C.;
4. The vessel was kept at 120° C. for 5 hours and the vessel was cooled down to 80° C. naturally;
4. 3 L of materials taken from the vessel was filtered rapidly. The filter was made by connecting Buchner flask to vacuum pump.
5. The filter cake was washed by 3 L of deionized water in three times and then dried at 110° C. for 6 hours to obtain the high titanium hydrochloric acid extract residue. The water content of the produced extract residue was lower than 1%.

Chemical composition of the enriched titanium hydrochloric acid extract residue was analyzed and the results were showed in Table 2:

TABLE 2

Main chemical compositions of the ilmenite concentrate in Panzhihua area and the enriched titanium hydrochloric acid extract residue (wt. %)

|  | $Al_2O_3$ | CaO | $Fe_2O_3$ | MgO | $SiO_2$ | $TiO_2$ | $V_2O_5$ |
|---|---|---|---|---|---|---|---|
| Feed (Ilmenite concentrate) | 0.9 | 1.1 | 44.0 | 4.0 | 3.0 | 46.1 | 0.1 |
| Enriched titanium hydrochloric acid extract residue | 0.5 | 0.7 | 4.9 | 0.5 | 4.8 | 86.2 | 0.1 |

Example 3

Preparation of Enriched Titanium Hydrochloric Acid Extract Residue from Ilmenite Concentrate by Direct Hydrochloric Acid Leaching 1. 45 L of 20% hydrochloric acid was measured and poured into a 50 L enamel-lining vessel;
2. 15 kg of ilmenite concentrate was weighted and poured into the vessel. The vessel was sealed and the mixer was started.
3. The vessel was heated rapidly to around 130° C. The vessel was Kept at 130° C. for 7 hours and the vessel was cooled down to 80° C. naturally;
4. Materials in the vessel were filtered in batches rapidly. The filter was made by connecting Buchner flask to vacuum pump.
5. The filter cake of each batch was washed by 3 L of deionized water in 3 times and then dried at 110° C. for 6 hours to obtain the enriched titanium hydrochloric acid extract residue. The water content of the produced extract residue was lower than 1%.

Chemical of the enriched titanium hydrochloric acid extract residue was analyzed and the results were showed in Table 3:

TABLE 3

Main chemical compositions of the ilmenite concentrate in Panzhihua area and the enriched titanium hydrochloric acid extract residue (wt. %)

|  | $Al_2O_3$ | CaO | FeO | $Fe_2O_3$ | MgO | $SiO_2$ | $TiO_2$ | $V_2O_5$ |
|---|---|---|---|---|---|---|---|---|
| Feed (Ilmenite concentrate) | 1.37 | 1.08 | 33.51 | 10.84 | 3.12 | 5.05 | 42.78 | 0.15 |
| Enriched titanium hydrochloric acid extract residue | 0.75 | 1.15 | 3.31 | 3.33 | 1.29 | 9.87 | 72.00 | 0.10 |

The enriched titanium hydrochloric acid extract residue can be utilized to produce titanium pigment by any kind of sulfuric acid processes. Depending on the sulfuric acid concentrations used in digesting and the state of the final product of the current sulfuric acid processes, there are three types: liquid-phase process, two-phase process and solid phase process. The procedure and the final product of digesting of enriched titanium hydrochloric acid extract residue are different from ilmenite to some extent. Specifically, Liquid-phase process refers to the digesting of enriched titanium hydrochloric acid extract residue by using 55-65% sulfuric acid in liquid phase wherein the reaction temperature is 130-140° C. and the reaction time is 1.5-4.0 hours, followed by the curing of the obtained viscous water-solid mixture at 140-220° C. to produce the solid mixture in lumps which will then be dissolved by water to provide titanium sulfate solution.

Two-phase process refers to the digesting of enriched titanium hydrochloric acid extract residue by using 65-70% sulfuric acid in liquid phase, wherein the reaction temperature is 160-180° C. and the reaction time is 20-60 minutes, followed by the curing of the obtained viscous water-solid mixture at 140-220° C. to produce the solid mixture in lumps.

Solid-phase process refers to the digesting of enriched titanium hydrochloric acid extract residue by using 80% plus sulfuric acid in liquid phase, wherein the reaction temperature is 160-200° C. and the reaction time is 5-20 minutes, followed by the curing of the obtained viscous solid mixture at 140-220° C. to provide the solid mixture in lumps.

Actually, all the methods used in digesting of enriched titanium hydrochloric acid extract residue by sulfuric acid can be classified as solid-phase process in the view of the states of final products and they only differ in reaction temperature and reaction time. When the sulfuric acid concentration is low, the reaction temperature becomes low and the reaction time gets long, and the final product is light yellow and relatively compact. On the contrary, when the sulfuric acid concentration is high, the reaction temperature gets high and the reaction becomes fast, and the yellowish-brown final product is of high porosity.

According to the present invention, titanium sulfate solution may be prepared by following the method below employing-digesting by sulfuric acid. The procedure is described as follows:

A. Sulfuric acid is mixed with the enriched titanium hydrochloric acid extract residue in the mass ratio of 1.4-1.9:1. After heated to 130-220° C., the heating is controlled to have the reaction proceeded and maintained the reaction temperature.

B. After reaction, the viscous solid mixture is obtained.

C. The obtained mixture is cured at 140-220° C. for 1-4 hours and then cooled down. Warm water, 2-3 times of volume of sulfuric acid, is added to have titanyl sulfate as well as titanium sulfate dissolved in the aqueous solution. Wherein, the curing refers to the further digesting of the digesting product, which is viscous solid mixture.

D. The solution is stirred till the solid mixture is dissolved and the titanium sulfate solution is obtained by filtration. The said titanium sulfate solution is the mixture of titanyl sulfate and titanium sulfate and can be utilized to prepare titanium pigment by following the state-of-the-arts. The ratio of iron to titanium dioxide ($Fe/TiO_2$) in the obtained titanium sulfate solution is 0.023-0.045. While utilizing ilmenite concentrate as feed stock to prepare titanium pigment by following the conventional sulfuric acid process, the ratio of iron to titanium dioxide in the titanium sulfate solution obtained is 0.2-0.33 (reported in *Manufacturing and Application Techniques* of *Titanium Dioxide* compiled by Chen C. and Liu C., Chemical Industry Press, p 211). Thus, the ratio of iron to titanium dioxide (Fe/$TiO_2$) in the titanium sulfate solution obtained from the method of the present invention is one magnitude lower than that from the conventional method to utilize ilmenite concentrate.

Wherein, the concentration of sulfuric acid used in step A is 55-98%. The heating is controlled to have the reaction proceeding and the reaction temperature maintained at 130-200° C. The stirring is persisted for 5-240 minutes in order to facilitate the completion of the reaction as well as the intensive mixing of the solid and the acid. Without stirring, solid and liquid will be separated into two layers while using sulfuric acid of low concentration.

In step C, except for warm water, an appropriate amount of 20% diluted sulfuric acid of 60-70° C. may be added to dissolve all the solid compounds, followed by adding water, the amount of which should give a $TiO_2$ concentration of 200 g/L in the titanium sulfate solution. The optimized leaching temperature is 60-85° C. The leaching temperature higher than 85° C. may hydrolyze titanyl sulfate and titanium sulfate to metatitanic acid precipitation and finally lost in the extract residue. However, the leaching temperature lower than 60° C. may cause slow dissolution where the leaching time is 1-2 hours. Warm water should not be added until the reaction is cooled downed to room temperature, the main reason of which is that mixing sulfuric acid with water is an exothermic reaction. Without cooling in advance, dissolution efficiency may be affected by hydrolysis of the titanium sulfate solution due to partially high temperature over 85° C. The titanium sulfate solution may be hydrolyzed if the temperature is too high or the acidity is too low partially after mixing water and the reactants. So the temperature of warm water should be around 40-60° C. and the addition amount should take a final $TiO_2$ concentration in titanium sulfate solution of about 200 g/L as a standard.

There are some issues of concern when utilizing enriched titanium hydrochloric acid extract residue as feed stock in sulfuric acid process to prepare titanium pigment:
1. The concentration of sulfuric acid: high concentration results in faster reaction but more costs.
2. The total amount of sulfuric acid to be used (or the ratio of acid to residue): larger quantity facilitates digesting of the enriched titanium hydrochloric acid extract residue but is disadvantageous for the hydrolysis afterwards. So the acid-residue ratio is normally 1.4-1.9:1. In the same amount of sulfuric acid, the preferred concentration is around 90%. The small volume due to high concentration will result in a fast but not complete reaction and will also causes the digesting product, the solid mixture, is so viscous that difficult to be stirred. Apparently, the reaction will last longer if the lower concentration is used.
3. The reaction temperature: The highest reaction temperature is determined by the sulfuric acid concentration selected, which is the boiling point of the sulfuric acid of such concentration. The reaction is performed fast if the temperature is high, the same as normal chemical engineering.
4. The reaction time (or the stirring time) can hardly be controlled in this case. It depends on the viscosity of reaction products. When the reaction products are too viscous to be stirred any longer, the reaction is complete and should move forward to the next step of curing.
5. The temperature and time of curing: curing is regarded as further digesting so temperature and time are two key factors.

The enriched titanium hydrochloric acid extract residue mainly contain non-crystal $TiO_2$ and metatitanic acid so the heat of reaction released in the digesting of the residue by sulfuric acid is much lower than that of ilmenite concentrate. During the digesting of ilmenite concentrate, the reaction gets started once the temperature reaches 80-120° C. and is performed violently, where the temperature of reactants is increased sharply by the heat of reaction. While the digesting of the enriched titanium hydrochloric acid extract residue won't get started until it reaches around 150° C. and the reaction is much milder.

Example 4

Digesting of Enriched Titanium Hydrochloric Acid Extract Residue by Sulfuric Acid 140 g of the enriched titanium hydrochloric acid extract residue obtained from Example 3 was added into a 1,000 ml beaker, and then 160 ml of 98% concentrated sulfuric acid was added, wherein the mass ratio of enriched titanium hydrochloric acid extract residue to 98% concentrated sulfuric acid was 1:1.75. The heating was started after stirring evenly and was continued while stirring. Once it reached around 150° C., the reaction proceeded spontaneously. When the reactants were turned into a viscous solid mixture after stirred for another 10 minutes, the beaker was placed in the oven of 200° C. for curing and kept the same temperature for 5 hours. The beaker was then taken out of the oven and cooled to room temperature. 300 ml of 20% diluted sulfuric acid of 60° C. was added to the beaker and stirred till all the reaction products were dispersed thoroughly. The solution was diluted to 600 ml while the system temperature was maintained at 70-85° C., then leached for 2 hours while stirring, and finally filtered by a ceramic funnel suction filter. The filter residue obtained every time was washed by 100 ml water for 3 times. The entire filter residue was dried and its chemical composition was then analyzed. The digesting ratio of $TiO_2$ by sulfuric acid was 98.1%. The filtrate was titanium sulfate solution and the analysis result of its composition was listed in Table 4.

TABLE 4

Analysis of titanium sulfate solution composition

| TFe (g/L) | $TiO_2$ (g/L) | Fe/$TiO_2$ Ratio | F Value |
|---|---|---|---|
| 8.4 | 198 | 0.043 | 2.35 |

Wherein, the F value refers to acidity coefficient, namely the ratio of the amount of effective acid to the total content of $TiO_2$.

$$F = \frac{\text{Amount of effective acid}}{\text{Total content of } TiO_2} = \frac{\text{Amount of acid combining to Ti} + \text{Amount of Free acid}}{\text{Total content of } TiO_2}$$

Example 5

Digesting of Enriched Titanium Hydrochloric Acid Extract Residue by Sulfuric Acid 200 g of the enriched titanium hydrochloric acid extract residue obtained from Example 3 was added into a 1,000 ml beaker, and then 166 ml of 98% concentrated sulfuric acid was added, wherein the mass ratio of enriched titanium hydrochloric acid extract residue to 98% concentrated sulfuric acid was 1:1.50. The heating started after stirring evenly and continued during stirring. Once it reached around 175° C., the reaction proceeded spontaneously. When the reactants were turned into a viscous solid mixture after being stirred for another 5 minutes, the beaker was placed in the oven of 180° C. for curing and kept the same temperature for 4 hours. The beaker was then taken out of the oven and cooled to room temperature. 300 ml of 20% diluted sulfuric acid of 60° C. was added to the beaker and stirred till all the reaction products were dispersed thoroughly. The solution was diluted to 600 ml while the system temperature was maintained at 70-85° C., then leached for 2 hours while stirring, and finally filtered by a ceramic funnel suction filter. The filter residue obtained every time was washed by 100 ml water for 3 times. The entire filter residue was dried out and its chemical composition was then analyzed. The digesting ratio of $TiO_2$ by sulfuric acid was 89.5%. The filtrate was titanium sulfate solution and the analysis result of its composition was listed in Table 5.

TABLE 5

Analysis of titanium sulfate solution composition

| TFe (g/L) | $TiO_2$ (g/L) | Fe/$TiO_2$ Ratio | F Value |
|---|---|---|---|
| 5.5 | 224 | 0.025 | 2.23 |

Example 6

Digesting of Enriched Titanium Hydrochloric Acid Extract Residue by Sulfuric Acid 200 g of the enriched titanium hydrochloric acid extract residue obtained from Example 3 was added into a 1,000 ml beaker, and then 89.1% sulfuric acid prepared by adding 28 g water into 170 ml of 98% concentrated sulfuric acid was added, wherein the mass ratio of enriched titanium hydrochloric acid extract residue to 98% concentrated sulfuric acid was 1:1.53. The heating started after stirring evenly and continued during stirring. Once it reached around 175° C., the reaction proceeded spontaneously. When the reactants were turned into a viscous solid mixture after being stirred for another 10 minutes, the beaker was placed in the oven of 180° C. for curing and kept the same temperature for 4 hours. The beaker was then taken out of the oven and cooled to room temperature. 300 ml of 20% diluted sulfuric acid of 60° C. was added to the beaker and stirred till all the reaction products were dispersed thoroughly. The solution was diluted to 600 ml while the system temperature was maintained at 70-85° C., then leached for 2 hours while stirring, and finally filtered by a ceramic funnel suction filter. The filter residue obtained every time was washed by 100 ml water for 3 times. The entire filter residue was dried and its chemical composition was then analyzed. The digesting ratio of $TiO_2$ by sulfuric acid was 96.0%. The filtrate was titanium sulfate solution and the analysis result of its composition was listed in Table 6.

TABLE 6

Analysis of titanium sulfate solution composition

| TFe (g/L) | $TiO_2$ (g/L) | Fe/TiO2 Ratio | F Value |
|---|---|---|---|
| 7.5 | 237 | 0.032 | 2.11 |

Example 7

Digesting of Enriched Titanium Hydrochloric Acid Extract Residue by Sulfuric Acid 200 g of the enriched titanium hydrochloric acid extract residue obtained from Example 3 was added into a 1,000 ml beaker, and then 84% sulfuric acid prepared by adding 47 g water into 170 ml of 98% concentrated sulfuric acid was added, wherein the mass ratio of enriched titanium hydrochloric acid extract residue to 100% concentrated sulfuric acid was 1:1.53. The heating started after stirring evenly and continued during stirring. Once it reached around 175° C., the reaction proceeded spontaneously. When the reactants were turned into a viscous solid mixture after stirred for another 15 minutes, the beaker was placed in the oven of 180° C. for curing and kept the same temperature for 4 hours. The beaker was then taken out of the oven and cooled to room temperature. 300 ml of 20% diluted sulfuric acid of 60° C. was added to the beaker and stirred till all the reaction products were dispersed thoroughly. The solution was diluted to 700 ml while the system temperature was maintained at 70-85° C., then leached for 2 hours while stirring, and finally filtered by a ceramic funnel suction filter. The filter residue obtained every time was washed by 100 ml water for 3 times. The entire filter residue was dried out and its chemical composition was then analyzed. The digesting ratio of $TiO_2$ by sulfuric acid was 97.7%. The filtrate was titanium sulfate solution and the analysis result of its composition was listed in Table 7.

TABLE 7

Analysis of titanium sulfate solution composition

| TFe (g/L) | $TiO_2$ (g/L) | Fe/$TiO_2$ Ratio | F Value |
|---|---|---|---|
| 7.0 | 205 | 0.034 | 2.07 |

Example 8

Digesting of Enriched Titanium Hydrochloric Acid Extract Residue by Sulfuric Acid 200 g of the enriched titanium hydrochloric acid extract residue obtained from Example 3 was added into a 1,000 ml beaker, and then 194 ml of 98% concentrated sulfuric acid was added, wherein the mass ratio of enriched titanium hydrochloric acid extract residue to 98% concentrated sulfuric acid was 1:1.75. The heating started after stirring evenly and continued during stirring. Once it reached around 175° C., the reaction proceeded spontaneously. When the reactants were turned into a viscous solid mixture after stirred for another 5 minutes, the beaker was placed in the oven of 180° C. for curing and kept the same temperature for 4 hours. The beaker was then taken out of the oven and cooled to room temperature. 300 ml of 20% diluted sulfuric acid of 60° C. was added to the beaker and stirred till all the reaction products were dispersed thoroughly. The solution was diluted to 700 ml while the system temperature was maintained at 70-85° C., then leached for 2 hours while stirring, and finally filtered by a ceramic funnel suction filter. The filter residue obtained every time was washed by 100 ml water for 3 times. The entire filter residue was dried out and its chemical composition was then analyzed. The digesting ratio of $TiO_2$ by sulfuric acid was 98.7%. The filtrate was titanium sulfate solution and the analysis result of its composition was listed in Table 8.

TABLE 8

| Analysis of titanium sulfate solution composition | | | |
|---|---|---|---|
| TFe (g/L) | $TiO_2$ (g/L) | Fe/TiO2 Ratio | F Value |
| 6.1 | 205 | 0.030 | 2.36 |

Example 9

Digesting of Enriched Titanium Hydrochloric Acid Extract Residue by Sulfuric Acid 200 g of the enriched titanium hydrochloric acid extract residue obtained from Example 3 was added into a 1,000 ml beaker, and then 194 ml of 98% concentrated sulfuric acid was added, wherein the mass ratio of enriched titanium hydrochloric acid extract residue to 98% concentrated sulfuric acid was 1:1.75. The heating started after stirring evenly and continued during stirring. Once it reached around 175° C., the reaction proceeded spontaneously. When the reactants were turned into a viscous solid mixture after stirred for another 5 minutes, the beaker was placed in the oven of 140° C. for curing and kept the same temperature for 4 hours. The beaker was then taken out of the oven and cooled to room temperature. 300 ml of 20% diluted sulfuric acid of 60° C. was added to the beaker and stirred till all the reaction products were dispersed thoroughly. The solution was diluted to 700 ml while the system temperature was maintained at 70-85° C., then leached for 2 hours while stirring, and finally filtered by a ceramic funnel suction filter. The filter residue obtained every time was washed by 100 ml water for 3 times. The entire filter residue was dried out and its chemical composition was then analyzed. The digesting ratio of $TiO_2$ by sulfuric acid was 89.1%. The filtrate was titanium sulfate solution and the analysis result of its composition was listed in Table 9.

TABLE 9

| Analysis of titanium sulfate solution composition | | | |
|---|---|---|---|
| TFe (g/L) | $TiO_2$ (g/L) | Fe/TiO2 Ratio | F Value |
| 4.8 | 188 | 0.025 | 2.63 |

Example 10

Digesting of Enriched Titanium Hydrochloric Acid Extract Residue by Sulfuric Acid 200 g of the enriched titanium hydrochloric acid extract residue obtained from Example 3 was added into a 1,000 ml beaker, and then 194 ml of 98% concentrated sulfuric acid was added, wherein the mass ratio of enriched titanium hydrochloric acid extract residue to 98% concentrated sulfuric acid was 1:1.75. The heating started after stirring evenly and continued during stirring. Once it reached around 175° C., the reaction proceeded spontaneously. When the reactants were turned into a viscous solid mixture after stirred for another 5 minutes, the beaker was placed in the oven of 180° C. for curing and kept the same temperature for 1 hour. The beaker was then taken out of the oven and cooled to room temperature. 300 ml of 20% diluted sulfuric acid of 60° C. was added to the beaker and stirred till all the reaction products were dispersed thoroughly. The solution was diluted to 700 ml while the system temperature was maintained at 70-85° C., then leached for 2 hours while stirring, and finally filtered by a ceramic funnel suction filter. The filter residue obtained every time was washed by 100 ml water for 3 times. The entire filter residue was dried out and its chemical composition was then analyzed. The digesting ratio of $TiO_2$ by sulfuric acid was 90.0%. The filtrate was titanium sulfate solution and the analysis result of its composition was listed in Table 10.

TABLE 10

| Analysis of titanium sulfate solution composition | | | |
|---|---|---|---|
| TFe (g/L) | $TiO_2$ (g/L) | Fe/TiO2 Ratio | F Value |
| 4.8 | 191 | 0.025 | 2.61 |

Example 11

Digesting of Enriched Titanium Hydrochloric Acid Extract Residue by Sulfuric Acid 200 g of the enriched titanium hydrochloric acid extract residue obtained from Example 3 was added into a 1,000 ml beaker, and then 75% sulfuric acid prepared by adding 107 g water into 194 ml of 98% concentrated sulfuric acid was added, wherein the mass ratio of enriched titanium hydrochloric acid extract residue to 98% concentrated sulfuric acid was 1:1.75. The heating started after stirring evenly and continued during stirring. Once it reached around 170° C., the reaction proceeded spontaneously. When the reactants were turned into a viscous solid mixture after stirred for another 45 minutes, the beaker was placed in the oven of 180° C. for curing and kept the same temperature for 4 hours. The beaker was then taken out of the oven and cooled to room temperature. 300 ml of 20% diluted sulfuric acid of 60° C. was added to the beaker and stirred till all the reaction products were dispersed thoroughly. The solution was diluted to 700 ml while the system temperature was maintained at 70-85° C., then leached for 2 hours while stirring, and finally filtered by a ceramic funnel suction filter. The filter residue obtained every time was washed by 100 ml water for 3 times. The entire filter residue was dried out and its chemical composition was then analyzed. The digesting ratio of $TiO_2$ by sulfuric acid was 98.1%. The filtrate was titanium sulfate solution and the analysis result of its composition was listed in Table 11.

TABLE 11

| Analysis of titanium sulfate solution composition | | | |
|---|---|---|---|
| TFe (g/L) | $TiO_2$ (g/L) | Fe/TiO2 Ratio | F Value |
| 7.5 | 215 | 0.035 | 2.29 |

Example 12

Digesting of Enriched Titanium Hydrochloric Acid Extract Residue by Sulfuric Acid 200 g of the enriched titanium hydrochloric acid extract residue obtained from Example 3 was added into a 1,000 ml beaker, and then 65% sulfuric acid prepared by adding 177 g water into 194 ml of 98% concentrated sulfuric acid was added, wherein the mass ratio of enriched titanium hydrochloric acid extract residue to 98% concentrated sulfuric acid was 1:1.75. The heating started after stirring evenly and continued during stirring. Once it reached around 140° C., the reaction proceeded spontaneously. When the reactants were turned into a viscous solid mixture after stirred for another 120 minutes, the beaker was placed in the oven of 180° C. for curing and kept the same temperature for 4 hours. The beaker was then taken out of the oven and cooled to room temperature. 300 ml of 20% diluted sulfuric acid of 60° C. was added to the beaker and stirred till all the reaction products were dispersed thoroughly. The solution was diluted to 700 ml while the system temperature was maintained at 70-85° C., then leached for 2 hours while stirring, and finally filtered by a ceramic funnel suction filter. The filter residue obtained every time was washed by 100 ml water for 3 times. The entire filter residue was dried out and its chemical composition was then analyzed. The digesting ratio of $TiO_2$ by sulfuric acid was 95.7%. The filtrate was titanium sulfate solution and the analysis result of its composition was listed in Table 12.

TABLE 12

| Analysis of titanium sulfate solution composition | | | |
|---|---|---|---|
| TFe (g/L) | $TiO_2$ (g/L) | Fe/TiO2 Ratio | F Value |
| 6.9 | 211 | 0.033 | 2.37 |

The invention claimed is:

1. Enriched titanium hydrochloric acid extract residue suitable for use in the preparation of titanium pigment by sulfuric acid process, wherein the extract residue is composed of metatitanic acid aggregates and loose and porous residue obtained after removing iron from crystal lattice of ilmenite ($FeTiO_3$) by hydrochloric acid leaching, wherein the loose and porous residue comprises rutile, titanaugite and amorphous $TiO_2$, and wherein the extract residue is prepared by:
  a. preparing enriched titanium hydrochloric acid extract residue solid from ilmenite by hydrochloric acid leaching and;
  b. drying the solid prepared in step a to obtain enriched titanium hydrochloric acid extract residue
  having a water content of no more than 20%, and wherein the extract residue can be dissolved by sulfuric acid
  wherein the extract residue is white, light yellow or light grey particle or powder and comprises 65-97 wt % amorphous $TiO_2$, the total iron content is no more than 8 wt % and the specific gravity of the extract residue is 2.9-3.6.

2. The enriched titanium hydrochloric acid extract residue according to claim 1, where the hydrochloric acid leaching process in step a is a direct hydrochloric acid leaching process, a BCA hydrochloric acid leaching process, a preoxidation-liquefaction leaching process, or preoxidation-united technologies of beneficiation and metallurgy pressure leaching process, wherein the direct hydrochloric acid leaching process comprises the following steps:
  A. mixing together ilmenite and hydrochloric acid, where the ratio of ilmenite to hydrochloric acid is 1 g:2.5-5 ml and the concentration of hydrochloric acid is 18%-30%; the ilmenite and hydrochloric acid are heated to 70-150° C. and the leaching reaction is carried out for 1-8 hours;
  B. filtering the leaching slurry after cooling down to 80-90° C.; and
  C. drying the obtained solid, wherein in step A hydrochloric acid is preheated to 70° C. before mixing with the ilmenite; wherein the drying temperature is maintained lower than 350° C., and the drying time is 4-8 hours; and the dried solid is the enriched titanium hydrochloric acid extract residue.

3. A method of using the enriched titanium hydrochloric acid extract residue of claim 1 as feed stock in the preparation of titanium pigment by a sulfuric acid process, wherein the sulfuric acid process comprises digesting and hydrolysis procedures:
  A. mixing sulfuric acid with the enriched titanium hydrochloric acid extract residue in a mass ratio of 1.4-1.9 to 1, heated to 130-220° C., and then the heating is controlled to have the sulfuric acid react with the enriched titanium hydrochloric acid extract residue while the reaction temperature is maintained;
  B. after reaction, obtaining a viscous solid mixture;
  C. curing the obtained mixture at 140-220° C. for 1-4 hours followed by cooling down, and adding warm water which is 2-3 times in volume of the sulfuric acid or 20% dilute sulfuric acid at a temperature of 60-70° C. to dissolve the mixture, and then adding water, wherein the amount of water is one that will result in a $TiO_2$ concentration of 200 g/L;
  D. stirring the mixture till the solid is dissolved and a titanium sulfate solution is obtained by filtration;
  wherein the concentration of sulfuric acid used in step A is 55-98%; and the mixture obtained in step A is further stirred for 5-240 minutes after being heated, wherein the reaction in step A starts at around 150° C. and performed mildly; in step C, the temperature of warm water is 40-60° C., the temperature is 60-85° C. after adding warm water or diluted sulfuric acid in step C.

4. The enriched titanium hydrochloric acid extract residue according to claim 1, wherein more than 90% of Ca, Mg, Fe and Mn impurities as well as more than 60% V and Al impurities are removed from ilmenite.

5. The enriched titanium hydrochloric acid extract residue according to claim 2, wherein the direct hydrochloric acid leaching process, BCA hydrochloric acid leaching process, preoxidation-liquefaction leaching process or preoxidation-united technologies of beneficiation and metallurgy pressure leaching process does not require high-temperature drying or calcination.

6. The method according to claim 3, wherein the enriched titanium hydrochloric acid extract residue can be used together with ilmenite or acid-soluble high titanium residue.

7. The enriched titanium hydrochloric acid extract residue according to claim 2, wherein the drying temperature in step C is lower than 250° C.

8. The method according to claim 3, wherein the concentration of sulfuric acid used in step A is 90%.

* * * * *